(12) United States Patent
Cha et al.

(10) Patent No.: US 11,088,360 B2
(45) Date of Patent: Aug. 10, 2021

(54) NEGATIVE ELECTRODE FOR RECHARGEABLE LITHIUM BATTERY, AND RECHARGEABLE LITHIUM BATTERY INCLUDING SAME

(71) Applicant: SAMSUNG SDI CO., LTD., Yongin-si (KR)

(72) Inventors: Inoh Cha, Yongin-si (KR); Jinhee Lee, Yongin-si (KR); Chaewoong Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 272 days.

(21) Appl. No.: 16/240,145

(22) Filed: Jan. 4, 2019

(65) Prior Publication Data

US 2019/0252673 A1 Aug. 15, 2019

(30) Foreign Application Priority Data

Feb. 9, 2018 (KR) .................. 10-2018-0016333

(51) Int. Cl.
*H01M 4/133* (2010.01)
*H01M 4/587* (2010.01)
*H01M 10/0525* (2010.01)
*H01M 4/02* (2006.01)
*H01M 10/0567* (2010.01)

(52) U.S. Cl.
CPC .......... *H01M 4/133* (2013.01); *H01M 4/587* (2013.01); *H01M 10/0525* (2013.01); *H01M 10/0567* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2012/0171566 A1 7/2012 Yoshitake et al.

FOREIGN PATENT DOCUMENTS

| KR | 10-2012-0042724 A | 5/2012 |
| KR | 10-2015-0028662 A | 3/2015 |
| KR | 10-2016-0060933 A | 5/2016 |

OTHER PUBLICATIONS

English Translation of KR 2016-0060933 obtained via Google Patents. May 31, 2016.*

* cited by examiner

*Primary Examiner* — Sarah A. Slifka
(74) *Attorney, Agent, or Firm* — Lee IP Law, P.C.

(57) ABSTRACT

A negative electrode for a rechargeable lithium battery includes a current collector and a negative active material layer disposed on the current collector. The negative active material layer includes a conductive material including a linear-shaped carbon-based material having an average length of about 40 μm to about 250 μm and a dot-shaped carbon-based material, and a negative active material. A mixing ratio of the conductive material and the negative active material is a weight ratio of about 0.1:99.9 to about 2.0:98.0.

19 Claims, 6 Drawing Sheets

NEGATIVE ELECTRODE FOR RECHARGEABLE LITHIUM BATTERY, AND RECHARGEABLE LITHIUM BATTERY INCLUDING SAME

CROSS-REFERENCE TO RELATED APPLICATION

Korean Patent Application No. 10-2018-0016333 filed on Feb. 9, 2018, in the Korean Intellectual Property Office, and entitled: "Negative Electrode for Rechargeable Lithium Battery, and Rechargeable Lithium Battery Including Same," is incorporated by reference herein in its entirety.

BACKGROUND

1. Field

Embodiments relate to an electrode for a rechargeable lithium battery and a rechargeable lithium battery including the same.

2. Description of the Related Art

A rechargeable lithium battery has recently drawn attention as a power source for small portable electronic devices. The rechargeable lithium battery uses an organic electrolyte solution and thereby, have twice or more as high a discharge voltage as a conventional battery using an alkali aqueous solution and accordingly, high energy density.

As for a positive active material of a rechargeable lithium battery, a lithium-transition metal oxide having a structure capable of intercalating lithium ions such as $LiCoO_2$, $LiMn_2O_4$, $LiNi_{1-x}Co_xO_2$ (0<x<1), and the like has been used.

SUMMARY

Embodiments are directed to a negative electrode for a rechargeable lithium battery, including a current collector and a negative active material layer disposed on the current collector. The negative active material layer includes a conductive material including a linear-shaped carbon-based material having an average length of about 40 m to about 250 m and a dot-shaped carbon-based material, and a negative active material. A mixing ratio of the conductive material and the negative active material is a weight ratio of about 0.1:99.9 to about 2.0:98.0.

The mixing ratio of the conductive material and the negative active material may be a weight ratio of about 0.3:99.7 to about 1.0:99.0.

The mixing ratio of the linear-shaped carbon-based material to the dot-shaped carbon-based material may be a weight ratio of about 1:1 to about 1:10.

An amount of the conductive material may be about 0.1 wt % to about 2.0 wt % based on 100 wt % of the negative active material layer.

An amount of the linear-shaped carbon-based material may be about 0.01 wt % to about 0.4 wt % based on 100 wt % of the negative active material layer.

The average length of the linear-shaped carbon-based material may be about 70 μm to about 250 μm.

An average diameter of the linear-shaped carbon-based material may be about 1 nm to about 20 nm.

A volume density (bulk density) of the linear-shaped carbon-based material may be less than or equal to about 0.1 $g/cm^3$.

The linear-shaped carbon-based material may include a carbon nanotube, a carbon nano fiber, or a combination thereof.

A Raman R value of the linear-shaped carbon-based material may be about 0.8 to about 1.3, wherein the Raman R value indicates an intensity ratio (R=Id/Ig, of a peak intensity (Id) of a D peak (about 1350 $cm^{-1}$ to about 1360 $cm^{-1}$) relative to a peak intensity (Ig) of a G peak (about 1580 $cm^{-1}$ to about 1590 $cm^{-1}$)) in a Raman spectrum analysis.

The Raman R value may be about 0.9 to about 1.1.

The dot-shaped carbon-based material may be carbon black.

An average particle diameter (D50) of the dot-shaped carbon-based material may be about 5 nm to about 100 nm.

A specific surface area (SSA) of the dot-shaped carbon-based material may be about 60 $m^2/g$ to about 1000 $m^2/g$.

Embodiments are also directed to a rechargeable lithium battery including the negative electrode as described above, a positive electrode, and a non-aqueous electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A negative electrode for a rechargeable lithium battery according to an embodiment includes a current collector and a negative active material layer disposed on the current collector. The negative active material layer may include a conductive material including a linear-shaped carbon-based material having an average length of about 40 μm to about 250 μm and a dot-shaped carbon-based material, and a negative active material. A mixing ratio of the conductive material and the negative active material by weight may be about 0.1:99.9 to about 2.0:98.0.

The negative electrode according to an embodiment may include a linear-shaped carbon-based material and a dot-shaped carbon-based material as a conductive material, for example, including providing heterogeneous conductive materials having a different shape.

An average length of the linear-shaped carbon-based material may be, for example, about 40 μm to about 250 μm, for example about 70 μm to about 250 μm, or about 100 μm to about 250 μm.

Accordingly, the heterogeneous conductive materials, for example, the linear-shaped carbon-based material having an average length within the ranges and the dot-shaped carbon-based material together may be used for a negative electrode. Accordingly, resistance of a battery may be decreased and battery performance may be improved. Resultantly, a battery having improved high rate charge/discharge performance and cycle-life characteristics may be provided.

When a dot-shaped carbon-based material is used alone, the dot-shaped carbon-based material would have to be used in a larger amount in order to increase electrical conductivity by decreasing the resistance of a battery. However, when the dot-shaped carbon-based material is used alone, initial efficiency may be undesirably deteriorated and capacity may be decreased.

The linear-shaped carbon-based material has an effect of improving the electrical conductivity compared with the dot-shaped carbon-based material. However, when a linear-shaped carbon-based material is used alone, the linear-shaped carbon-based material may not be well dispersed in a negative active material composition for a negative active material layer and thus may not be used sufficiently enough to show appropriate electrical conductivity.

In addition, even when the linear-shaped carbon-based material and the dot-shaped carbon-based material are used together as a conductive material, if the linear-shaped carbon-based material has a shorter average length than about 40 μm, the effect of improving electrical conductivity and maintaining initial efficiency due to the mixed use of the linear-shaped carbon-based material and the dot-shaped carbon-based material may not be obtained. On the other hand, a linear-shaped carbon-based material having a longer average length than about 250 μm may not be economical. In addition, when a linear-shaped carbon-based material having a longer average length than about 250 μm is used, dispersion stability may be deteriorated, and thus neither a well-formed active material layer nor a uniform active material layer may be formed.

The mixing ratio of the conductive material and the negative active material may be a weight ratio of about 0.1:99.9 to about 2.0:98, or, for example a weight ratio of about 0.3:99.7 to about 1.0:99.0. When the mixing ratio of the conductive material and the negative active material are within the range, that is, the conductive material is used in a weight ratio of about 0.1 or more, a desired effect (conductivity, reactivity improvement) of the conductive material may be sufficiently obtained. When the conductive material is used in a weight ratio of about 2.0 or less, processability of a negative active material composition may be obtained, deteriorating battery capacity according to efficiency deterioration, deteriorating cycle-life characteristics, and the like may be avoided.

An amount of the conductive material may be about 0.1 wt % to about 2.0 wt %, or, for example about 0.3 wt % to about 1 wt % based on a total weight (100 wt %) of the negative active material layer.

When the negative electrode according to an embodiment uses the linear-shaped carbon-based material having an average length of about 40 μm to about 250 μm and the dot-shaped carbon-based material together as a conductive material and efficiency of electron movement may be improved and sufficient electrical conductivity may be obtained with a small amount of the conductive material. If the linear-shaped conductive material were to be used alone, a distance for the electron movement might be increased, but the electron movement over a short distance could be deteriorated. If the dot-shaped carbon-based material were to be used alone, the electron movement in a short distance might appropriately occur, but the dot-shaped conductive material could be inappropriately used in an excessive amount in order to increase the electron movement in a long distance. When an amount of the conductive material is used within the ranges, an amount of a negative active material may be relatively increased, and thus battery capacity may be further increased.

The conductive material may include the linear-shaped carbon-based material and the dot-shaped carbon-based material in a weight ratio of about 1:1 to about 1:10, or, for example, in a weight ratio of about 1:1 to about 1:5, or, for example, in a weight ratio of about 1:3 to 1:5. For example, the linear-shaped carbon-based material and the dot-shaped carbon-based material may be desirably used equally or within a weight range of about 1:10. If the linear-shaped carbon-based material were to be used in a larger amount than the dot-shaped carbon-based material, viscosity of a negative active material layer composition for a negative active material layer may be excessively increased. Thus, the negative active material layer composition may be difficult to coat onto a current collector and thus forming a negative active material layer may fail. In addition, when the dispersion stability of the negative active material layer composition is deteriorated, the negative active material layer composition may not be homogeneously and uniformly formed into a negative active material layer. A non-uniform negative active material layer have an undesirable influence on battery characteristics. In addition, if the linear-shaped carbon-based material were to be excessively used, the amount of the conductive material among an active material may be rather decreased, and thus conductivity may be relatively deteriorated. In addition, if the linear-shaped carbon-based material were to be in a smaller amount than about ¹⁄₁₀ of that of the dot-shaped carbon-based material, the linear-shaped carbon-based material may be used in too small an amount and thus may have an insufficient effect of improving a high rate charge and may not achieve an appropriate effect of the conductive material.

An amount of the linear-shaped carbon-based material may be about 0.01 wt % to about 0.4 wt %, or, for example about 0.01 wt % to about 0.2 wt %, based on a total weight (100 wt %) of the negative active material layer. When the linear-shaped carbon-based material is used within the amount range, appropriate viscosity for forming a negative active material layer may be obtained, the electron movement in a long distance may be effectively promoted by effectively reducing movement resistance in a relatively long distance.

An average diameter of the linear-shaped carbon-based material may be about 1 nm to about 20 nm, or, for example, about 5 nm to about 20 nm, or, for example, about 15 nm to about 20 nm. When the linear-shaped carbon-based material has an average diameter of greater than or equal to about 1 nm, dispersibility of a negative active material composition including the linear-shaped carbon-based material may be improved, and thus, the linear-shaped carbon-based material be used in a sufficient amount to function as a conductive material. In addition, when the linear-shaped carbon-based material has an average diameter of less than or equal to about 20 nm, resistance of a negative electrode may be decreased.

A volume density (bulk density) of the linear-shaped carbon-based material may be less than or equal to about 0.1 $g/cm^3$, or, for example about 0.001 $g/cm^3$ to about 0.1 $g/cm^3$, or, for example, about 0.01 $g/cm^3$ to about 0.1 $g/cm^3$. When the linear-shaped carbon-based material has volume density within the ranges, resistance characteristics, low temperature characteristics, discharge characteristics, storage characteristics at a high temperature, and the like of a rechargeable lithium battery manufactured by using the same may be improved overall.

The linear-shaped carbon-based material may include a carbon nanotube, a carbon nano fiber, or a combination thereof. The carbon nanotube may be a single-walled carbon nanotube, a double-walled carbon nanotube, a multi-walled carbon nanotube, or a combination thereof. According to an embodiment, the linear-shaped carbon-based material may be a single-walled carbon nanotube, a double-walled carbon nanotube, or a combination thereof. When the carbon nanotube is used as the linear-shaped carbon-based material, dispersibility may be further improved, excellent processability such as a coating process and the like for forming an active material layer may be obtained, and ion conductivity of the active material layer may be further improved.

The linear-shaped carbon-based material may have a Raman R value in a range of about 0.8 to about 1.3, or, for example, in a range of about 0.9 to about 1.1. The Raman R value indicates an intensity ratio (R=Id/Ig) of a peak intensity (Id) of a D peak (about 1350 $cm^{-1}$ to about 1360 $cm^{-1}$) relative to a peak intensity (Ig) of a G peak (about 1580 $cm^{-1}$ to about 1590 $cm^{-1}$)) in a Raman spectrum analysis.

In the present specification, Raman spectrum peak intensity may be measured by using a laser emitting light of a wavelength of about 514 nm or about 633 nm, or, for example, a wavelength of about 514 nm. A Raman spectrum may be in general interpreted through a height ratio (an intensity ratio) or an integral area ratio of a peak. In an embodiment of the present disclosure, the height ratio is adopted.

When the linear-shaped carbon-based material has a Raman R value within the ranges, dispersibility of the linear-shaped carbon-based material in an active material layer may be further improved, and thus, the active material layer may have excellent conductivity.

The dot-shaped carbon-based material may be carbon black. An average particle diameter (D50) of the dot-shaped carbon-based material may be about 5 nm to about 100 nm, or, for example about 20 nm to about 50 nm. As used herein, when a definition is not otherwise provided, the term "average particle diameter (D50)" indicates a particle diameter where an accumulated volume is about 50 volume % in a particle distribution.

When the dot-shaped carbon-based material has an average particle diameter (D50) within the ranges, an effect of reducing resistance of a negative electrode and improving conductivity may be much increased.

In addition, the dot-shaped carbon-based material may have a specific surface area (SSA) in a range of about 60 $m^2/g$ to about 1,000 $m^2/g$ or, for example, in a range of about 500 $m^2/g$ to about 800 $m^2/g$. When nano carbon has a specific surface area within the ranges, resistance of an electrode may be reduced, and in addition, input and output characteristics and a cycle-life characteristics of a battery cell may be improved.

In the present specification, the specific surface area is measured in a nitrogen adsorption method or a BET (Brunauer Emmett Teller) method.

The negative active material includes a material that reversibly intercalates/deintercalates lithium ions, a lithium metal, a lithium metal alloy, a material being capable of doping/dedoping lithium, or transition metal oxide.

The material that reversibly intercalates/deintercalates lithium ions may include carbon materials. The carbon material may be any generally-used carbon-based negative active material in a rechargeable lithium battery. Examples of the carbon-based negative active material may include crystalline carbon, amorphous carbon, or a combination thereof. Examples of the crystalline carbon may include graphite such as non-shaped, or sheet, flake, spherical, or fiber shaped natural graphite or artificial graphite. Examples of the amorphous carbon may be soft carbon or hard carbon, a mesophase pitch carbonized product, fired coke, or the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, Sn—R alloy (wherein R is an element selected from an alkali metal, an alkaline-earth metal, a Group 13 element, a Group 14 element, a Group 15 element, a Group 16 element, a transition metal, a rare earth element, and a combination thereof and not Sn), a Sn-carbon composite, or the like. At least one of the above materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

The Si-carbon composite may include a silicon particle and crystalline carbon. An average particle diameter (D50) of the silicon particle may be about 10 nm to about 200 nm. The Si-carbon composite may further include an amorphous carbon layer on at least part thereof.

The negative active material layer may include a binder in addition to the negative active material and the conductive material.

The binder may improve binding properties of negative active material particles with one another and with a current collector. The binder may include a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

When the negative active material layer includes a binder along with the negative active material and the conductive material, an amount of the negative active material may be about 93.0 wt % to about 98.1 wt %, an amount of the conductive material may be about 0.1 wt % to about 2.0 wt %, and an amount of the binder may be about 1.8 wt % to about 5.0 wt %.

The negative current collector may be selected from a copper foil, a nickel foil, a stainless steel foil, a titanium foil, a nickel foam, a copper foam, a polymer substrate coated with a conductive metal, or a combination thereof.

Another embodiment provides a rechargeable lithium battery including the negative electrode, a positive electrode including a positive active material, and an electrolyte.

In the negative electrode of the rechargeable lithium battery, the linear-shaped carbon-based material and the dot-shaped carbon-based material may be used in a mixing weight ratio of about 1:1 to about 1:10. In the negative electrode, the presence of the linear-shaped carbon-based material and the dot-shaped carbon-based material may be confirmed through a thermo-gravimetric analysis (TGA) method.

In the negative electrode, an amount of a conductive material including the linear-shaped carbon-based material and the dot-shaped carbon-based material may be in a range of about 0.1 wt % to about 2.0 wt % based on 100 wt % of the negative active material layer, or for example, in a range of about 0.3 wt % to about 1 wt %, which may be confirmed through a (TGA) method. For example, when the negative electrode is analyzed through the thermo-gravimetric analysis method, a thermo-gravimetric curved line derived from combustion of a binder is shown at around about 200° C. to about 300° C., a curved line derived from combustion of the dot-shaped carbon-based material is shown at around 400° C. or greater, and a curved line derived from combustion of the linear-shaped carbon-based material is shown at around about 600° C. or greater. Weight ratios of the binder, the dot-shaped carbon-based material, and the linear-shaped carbon-based material may be obtained from each weight loss (%) through these thermo-gravimetric profiles.

The positive electrode includes a current collector and a positive active material layer disposed on the current collector, the positive active material including a positive active material.

The positive active material may include a compound (lithiated intercalation compound) being capable of intercalating and deintercalating lithium. For example, at least one composite oxide of lithium and a metal of cobalt, manganese, nickel, or a combination thereof may be used. Specific examples thereof may include a compound represented by one of chemical formulae. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Co_bX_cO_{2-\alpha}T_2$ ($0.90 \le a \le 1.8$, $0 \le b \le 0.5$, $0 \le c \le 0.05$, $0 \le \alpha \le 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_2-T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$)

In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The positive active material may include the positive active material with the coating layer, or a compound of the active material and the active material coated with the coating layer. The coating layer may include a coating element compound of an oxide or hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include a suitable process that does not cause side effects on the properties of the positive active material (e.g., spray coating, immersing).

In the positive electrode, an amount of the positive active material may be about 90 wt % to about 98 wt % based on the total weight of the positive active material layer.

In an embodiment, the positive active material layer may further include a binder and a conductive material. The amount of each of the binder and conductive material may be about 1 wt % to about 5 wt % based on the total weight of the positive active material layer.

The binder may improve binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to improve electrode conductivity. A suitable electrically conductive material that does not cause a chemical change may be used. Examples of the conductive material may include a carbon-based material such as natural graphite, artificial graphite, carbon black, acetylene black, ketjen black, carbon fiber or the like; a metal-based material of a metal powder or a metal fiber including copper, nickel, aluminum, silver, or the like; a conductive polymer such as a polyphenylene derivative, or a mixture thereof.

The current collector may include an aluminum foil, a nickel foil, or a combination thereof.

The positive active material layer and the negative active material layer may be formed by mixing a negative active material, a binder, and optionally a conductive material in a solvent to prepare an active material composition, and coating the active material composition onto a current collector followed by compressing and drying the same. The solvent may include N-methylpyrrolidone or the like, as an example. In addition, when a water-soluble binder is used as a binder of the negative active material layer, water may be used as a solvent.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, propyl propionate, decanolide, mevalonolactone, caprolactone, or the like. The ether-based solvent may include dibutyl ether, tetraglyme, diglyme, dimethoxyethane, 2-methyltetrahydrofuran, tetrahydrofuran, and the like. The ketone-based solvent may include cyclohexanone, and the like. The alcohol-based solvent may include ethanol, isopropyl alcohol, or the like. The aprotic solvent may include a nitrile such as R—CN (wherein R is a hydrocarbon group having a C2 to C20 linear, branched, or cyclic structure and may include a double bond, an aromatic ring, or an ether bond), or the like, an amide such as dimethyl formamide, or the like, a dioxolane such as 1,3-dioxolane, or the like, a sulfolane, or the like.

The non-aqueous organic solvent may be used alone or in a mixture. When the organic solvent is used in a mixture, the mixture ratio may be controlled in accordance with a desirable battery performance.

The carbonate-based solvent is prepared by mixing a cyclic carbonate and a linear carbonate. The cyclic carbonate and linear carbonate may be mixed together in a volume ratio of about 1:1 to about 1:9. When the mixture is used as an electrolyte, it may have enhanced performance.

When the non-aqueous organic solvent is used in a mixture, the non-aqueous organic solvent may be a mixed solvent of cyclic carbonate and linear (chain) carbonate, a mixed solvent of cyclic carbonate and a propionate based solvent, or a mixed solvent of cyclic carbonate, linear carbonate, and a propionate based solvent. The propionate-based solvent may be methylpropionate, ethylpropionate, propylpropionate, or a combination thereof.

When the cyclic carbonate and the linear carbonate or the cyclic carbonate and the propionate based solvent are mixed, they may be mixed in a volume ratio of about 1:1 to about 1:9. Thus, performance of an electrolyte solution may be improved. When the cyclic carbonate, the linear carbonate, and the propionate based solvent are mixed, they may be mixed in a volume ratio of about 1:1:1 to about 3:3:4. The mixing ratios of the solvents may be appropriately adjusted according to desirable properties.

The non-aqueous organic solvent may further include an aromatic hydrocarbon-based organic solvent in addition to the carbonate based solvent. The carbonate based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1.

[Chemical Formula 1]

In Chemical Formula 1, $R_1$ to $R_6$ may be the same or different and may be selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound represented by Chemical Formula 1 in order to improve cycle life of a battery.

[Chemical Formula 2]

In Chemical Formula 2, $R_7$ and $R_8$ may be the same or different and may be selected from hydrogen, a halogen, a cyano group (CN), a nitro group (NO$_2$), and a fluorinated C11 to C5 alkyl group, provided that at least one of R$_7$ and R$_8$ is selected from a halogen, a cyano group (CN), a nitro group (NO$_2$), and a fluorinated C11 to C5 alkyl group, and R$_7$ and R$_8$ are not simultaneously hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be used within an appropriate range.

The electrolyte may further include vinylethylene carbonate, propanesultone, succinonitrile, or a combination thereof. The use amount may be controlled appropriately.

The lithium salt dissolved in an organic solvent may supply a battery with lithium ions, basically operate the rechargeable lithium battery, and improve transportation of the lithium ions between positive and negative electrodes. Examples of the lithium salt include at least one supporting salt selected from LiPF$_6$, LiBF$_4$, LiSbF$_6$, LiAsF$_6$, LiN(SO$_2$C$_2$F$_5$)$_2$, Li(CF$_3$SO$_2$)$_2$N, LiN(SO$_3$C$_2$F$_5$)$_2$, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$) (where x and y are natural numbers, for example, an integer ranging from 1 to 20), LiCl, LiI, and LiB(C$_2$O$_4$)$_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 1:
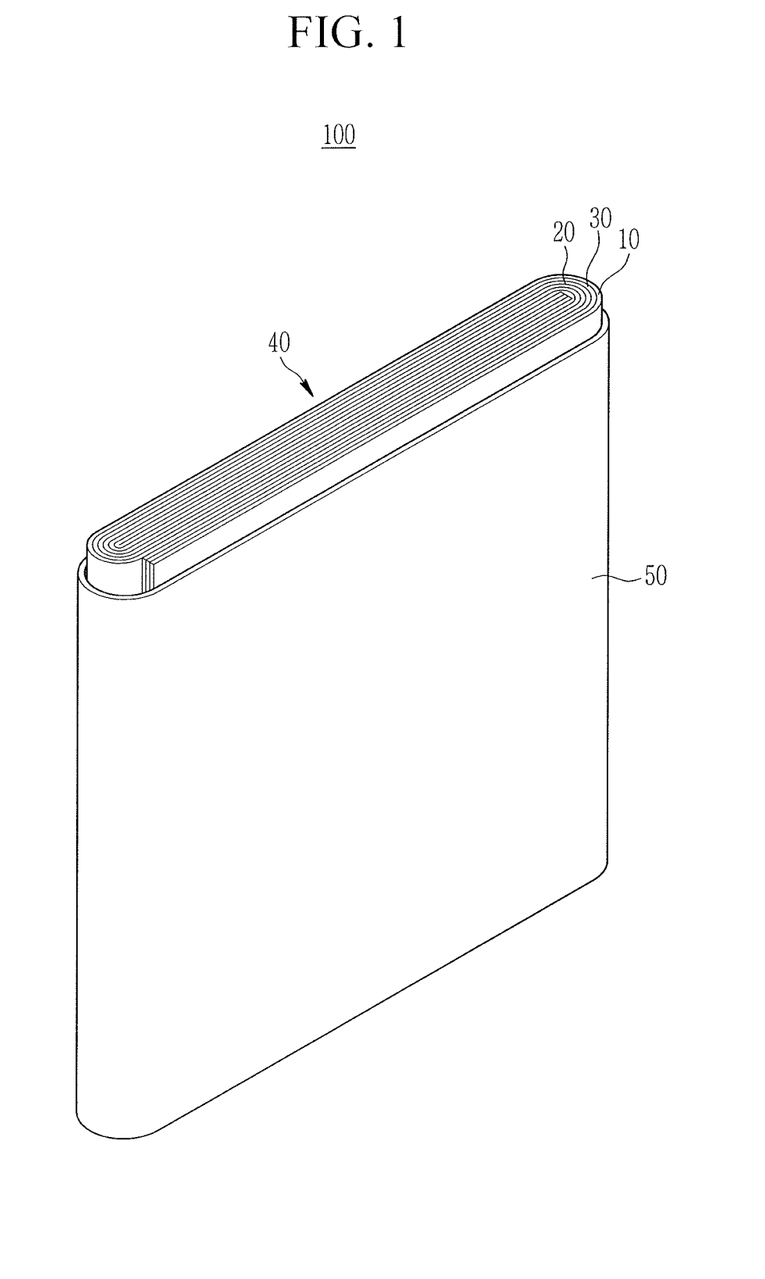
FIG. 1 illustrates a schematic view showing a structure of a rechargeable lithium battery according to an embodiment.

FIG. 1 illustrates an exploded perspective view of a rechargeable lithium battery according to an embodiment. The rechargeable lithium battery according to an embodiment is illustrated as a prismatic battery. In other implementations, the may be variously-shaped. For example, the rechargeable lithium battery may be a cylindrical battery, a pouch battery, or the like.

Referring to FIG. 1, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte (not shown) may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

A single-walled carbon nanotube having an average length of 200 μm, an average diameter of 20 nm, and volume density (bulk density) of 0.08 g/cm$^3$ was prepared. When a Raman spectrum of the carbon nanotube was measured by using a laser of a wavelength of 514 nm, R of an intensity ratio (R=Id/Ig) of a peak intensity (Id) of a D peak (1350 cm$^{-1}$) relative to a peak intensity (Ig) of a G peak (1580 cm$^{-1}$) was 0.95.

In addition, carbon black having an average particle diameter (D50) of 30 nm and a specific surface area of 280 m$^2$/g was prepared.

96.3 wt % of an artificial graphite negative active material, 0.1 wt % of the carbon nanotube, 0.5 wt % of the carbon black, 1.1 wt % of carboxymethyl cellulose, and 2.0 wt % of a styrene-butadiene rubber were mixed in a deionized water solvent to prepare negative active material slurry.

The negative active material slurry was coated onto a Cu foil, dried, and compressed to manufacture a negative electrode.

98.0 wt % of a LiCoO$_2$ positive active material, 1.0 wt % of a ketjen black conductive material, and 1.0 wt % of a polyvinylidene fluoride binder were mixed in an N-methyl pyrrolidone solvent to prepare a positive active material slurry. The slurry was coated onto an Al foil, dried, and compressed to manufacture a positive electrode.

The negative and positive electrodes and an electrolyte were used to manufacture a rechargeable lithium battery cell in a common method.

The electrolyte was prepared by dissolving 1.2 M LiPF$_6$ in a mixed solvent (a volume ratio of 50:50) of ethylene carbonate and dimethyl carbonate.

Example 2

A negative electrode was manufactured according to the same method as Example 1 except for preparing the negative active material slurry by mixing 96.5 wt % of an artificial graphite negative active material, 0.1 wt % of the carbon nanotube, 0.3 wt % of the carbon black, 1.1 wt % of carboxymethyl cellulose, and 2.0 wt % of a styrene-butadiene rubber in a deionized water solvent.

A rechargeable lithium battery cell was manufactured by using the negative electrode and the same positive electrode and electrolyte as those of Example 1.

Comparative Example 1

A negative active material slurry was prepared by mixing 96.9 wt % of an artificial graphite negative active material, 1.1 wt % of carboxymethyl cellulose, and 2.0 wt % of a styrene-butadiene rubber in a deionized water solvent.

The negative active material slurry was coated onto a Cu foil, dried, and compressed to manufacture a negative electrode.

A rechargeable lithium battery cell was manufactured by using the negative electrode and the same positive electrode and electrolyte as those of Example 1.

Comparative Example 2

A negative electrode was manufactured according to the same method as Example 1 except for preparing the negative active material slurry by mixing 96.4 wt % of a graphite negative active material, 0.5 wt % of the carbon black used in Example 1, 1.1 wt % of carboxymethyl cellulose, and 2.0 wt % of a styrene-butadiene rubber in deionized water solvent.

A rechargeable lithium battery cell was manufactured by using the negative electrode and the same positive electrode and electrolyte as those of Example 1.

Comparative Example 3

A negative electrode was manufactured according to the same method as Example 1 except for preparing the negative active material slurry by mixing 96.7 wt % of a graphite negative active material, 0.2 wt % of the carbon black used in Example 1, 1.1 wt % of carboxymethyl cellulose, and 2.0 wt % of a styrene-butadiene rubber in deionized water solvent.

A rechargeable lithium battery cell was manufactured by using the negative electrode and the same positive electrode and electrolyte as those of Example 1.

Comparative Example 4

A negative electrode was manufactured according to the same method as Example 1 except for preparing negative active material slurry by mixing 95.9 wt % of a graphite negative active material, 1.0 wt % of the carbon black used in Example 1, 1.1 wt % of carboxymethyl cellulose, and 2.0 wt % of a styrene-butadiene rubber in a deionized water solvent.

A rechargeable lithium battery cell was manufactured by using the negative electrode and the same positive electrode and electrolyte as those of Example 1.

Comparative Example 5

A single-walled carbon nanotube having an average length of 15 μm, 130 nm of an average diameter, and 0.085 g/cm$^3$ of volume density (bulk density) was prepared. When a Raman spectrum of the carbon nanotube was measured by using a laser of a wavelength of 514 nm, R of an intensity ratio (R=Id/Ig) of a peak intensity (Id) of a D peak (1350 cm$^{-1}$) relative to a peak intensity (Ig) of a G peak (1580 cm$^{-1}$) was 1.03.

A negative active material slurry was prepared by mixing 96.3 wt % of an artificial graphite negative active material, 0.1 wt % of the carbon nanotube, 0.5 wt % of the carbon black used in Example 1, 1.1 wt % of carboxymethyl cellulose, and 2.0 wt % of a styrene-butadiene rubber in a deionized water solvent.

The negative active material slurry was used to manufacture a negative electrode according to the same method as Example 1.

A rechargeable lithium battery cell was manufactured by using the negative electrode and the same positive electrode and electrolyte as those of Example 1.

Comparative Example 6

A negative electrode was manufactured according to the same method as Example 1 except for preparing a negative active material slurry by mixing 96.2 wt % of an artificial graphite negative active material, 0.2 wt % of the carbon nanotube used in Comparative Example 1, 0.5 wt % of the carbon black according to Example 1, 1.1 wt % of carboxymethyl cellulose, and 2.0 wt % of a styrene-butadiene rubber in a deionized water solvent.

A rechargeable lithium battery cell was manufactured by using the negative electrode and the same positive electrode and electrolyte as those of Example 1.

Reference Example 1

A negative electrode was manufactured according to the same method as Example 1 except for using 95.9 wt % of an artificial graphite negative active material, 0.08 wt % of the carbon nanotube, 0.92 wt % of the carbon black, 1.1 wt % of carboxymethyl cellulose, and 2.0 wt % of a styrene-butadiene rubber in a deionized water solvent to prepare negative active material slurry.

A rechargeable lithium battery cell was manufactured by using the negative electrode and the same positive electrode and electrolyte as those of Example 1.

Reference Example 2

A negative electrode was manufactured according to the same method as Example 1 except for preparing negative active material slurry by mixing 96.6 wt % of an artificial graphite negative active material, 0.2 wt % of the carbon nanotube used in Example 1, 0.1 wt % of the carbon black used in Example 1, 1.1 wt % of carboxymethyl cellulose, and 2.0 wt % of a styrene-butadiene rubber in a deionized water solvent.

A rechargeable lithium battery cell was manufactured by using the negative electrode and the same positive electrode and electrolyte as those of Example 1.

Each mixing ratio between the conductive material and the negative active material and between the carbon nanotube and the carbon black according to Examples 1 to 2, Comparative Examples 1 to 6, and Reference Examples 1 to 2 is shown in Table 1.

TABLE 1

|  | Average length of carbon nanotube (μm) | Mixing ratio (weight ratio) of conductive material:negative active material | Mixing ratio (weight ratio) of carbon nanotube and carbon black |
|---|---|---|---|
| Example 1 | 200 | 0.6:96.3 = 0.6:99.4 | 0.1:0.5 = 1:5 |
| Example 2 | 200 | 0.4:96.5 = 0.4:99.6 | 0.1:0.3 = 1:3 |
| Comparative Example 1 | — | — | — |
| Comparative Example 2 | — | 0.5:96.4 = 0.4:99.6 | 0:0.5 |
| Comparative Example 3 | 200 | 0.2:96.7 = 0.2:99.8 | 0.2:0 |
| Comparative Example 4 | — | 1.0:95.9 = 1:99.0 | 0:1.0 |
| Comparative Example 5 | 15 | 0.6:96.3 = 0.6:99.4 | 0.1:0.5 = 1:5 |
| Comparative Example 6 | 15 | 0.7:96.2 = 0.7:99.3 | 0.2:0.5 = 1:2.5 |
| Reference Example 1 | 200 | 1.0:95.9 = 1:99.0 | 0.08:0.92 = 1:11.5 |
| Reference Example 2 | 200 | 0.3:96.6 = 0.3:99.7 | 0.2:0.1 = 1:0.5 |

Measurement of DC Internal Resistance (Direct Current, Internal Resistance: DC-IR)

DC internal resistances (DC-IR) of the rechargeable lithium battery cells according to Example 1 and the Comparative Examples 1 to 4 were measured in the following method.

1) SOC70

The rechargeable lithium battery cells were charged under a constant current/constant voltage at a current of 0.2 C up to a voltage of SOC (a state of charge) of 70% (a state of being charged to have charge capacity of 70% based on 100% of the entire charge capacity of a battery cell) and cut off at 0.05 C at the first cycle. Then, the rechargeable lithium battery cells were discharged under a constant current at 0.2 C up to SOC of 70% and then, cut off. Subsequently, the rechargeable lithium battery cells were charged at 2 C and discharged under a constant current at SOC of 70% for 1 second, and then, their dV's were measured at 0.2 C and 2 C to obtain DC-IR.

2) SOC20

The rechargeable lithium battery cells were charged under a constant current/constant voltage—at a current of 0.2 C up to a voltage of SOC (a state of charge) 20% (a state of being charged 20% charge capacity to have charge capacity of 20% based on 100% of the entire charge capacity of a battery) and cut off at 0.05 C at the first cycle. Then, the rechargeable lithium battery cells were discharged under a constant current at 0.2 C down to SOC of 20% and then, cut off. Subsequently, the rechargeable lithium battery cells were charged at 2 C and discharged under a constant current at SOC of 20% for 1 second, and then, their dV's at 0.2 C and 2 C were measured to obtain DC-IR.

3) SOC10

The rechargeable lithium battery cells were charged under a constant current/constant voltage at a current of 0.2 C up to a voltage of SOC (a state of charge) 10% (a state of being charged 20% charge capacity to have charge capacity of 20% based on 100% of the entire charge capacity of a battery) and cut off at 0.05 C at the first cycle. Then, the rechargeable lithium battery cells were discharged under a constant current at 0.2 C down to SOC of 10% and then, cut off. Subsequently, the rechargeable lithium battery cells were charged at 2 C and discharged under a constant current at SOC of 10% for 1 second, and then, their dV's at 0.2 C and 2 C were measured to obtain DC-IR.

The result of SOC70, SOC20, and SOC10 are shown in Table 2.

TABLE 2

| | Resistivity | DC-IR (mΩ) | | |
|---|---|---|---|---|
| | (Ωm) | SOC70 | SOC20 | SOC10 |
| Comparative Example 1 | 0.93 | 42.7 | 46.3 | 47.8 |
| Comparative Example 2 | 0.13 | 39.3 | 43.1 | 46.0 |
| Example 1 | 0.13 | 38.8 | 43.0 | 45.7 |
| Comparative Example 3 | 0.26 | 40.0 | 44.1 | 46.8 |
| Comparative Example 4 | 0.09 | 38.5 | 42.8 | 45.8 |

As shown in Table 2, the battery cell of Example 1 including carbon nanotube having an average length of 200 μm and carbon black in a weight ratio of 5:1 showed remarkably low resistivity and low DC internal resistance compared with Comparative Example 1 using no conductive material.

The battery cell of Comparative Example 2 using only carbon black in a small amount of 0.5 wt % showed similar resistivity but high DC internal resistance compared with Example 1. In addition, the battery cell of Comparative Example 3 using only carbon nanotube showed high resistivity and high DC internal resistance compared with Example 1.

The battery cell of Comparative Example 4 using carbon black in an excessive amount of 1 wt % showed a little lower resistivity than that of Example 1 but similar DC internal resistance to that of Example 1.

Referring to the results, when the carbon nanotube having an average length of 200 m and the carbon black were used as a conductive material, even though the amount of the conductive material was reduced to 0.6 wt %, equivalent resistivity to that of 1% of the conductive material was obtained. Accordingly, it is shown that the conductive material may be used in a smaller amount.

Evaluation of High-Rate Cycle-Life Characteristics

The rechargeable lithium battery cells according to Example 1 and Comparative Examples 2 to 3 were charged under a constant current/constant voltage with a cut-off condition of 3.0 C, 4.4 V, and 0.05 C at room temperature (25° C.), paused for 10 minutes, discharged under a constant current with a cut-off condition of 1.0 C, 3.0 V, and 3.0 V, and then, paused for 10 minutes as one charge and discharge cycle. The charge and discharge cycle was repeated 400 times. A ratio of discharge capacity at the $400^{th}$ cycle relative to discharge capacity at the $1^{st}$ cycle, and the results are shown in FIG. 2.

Figure 2:
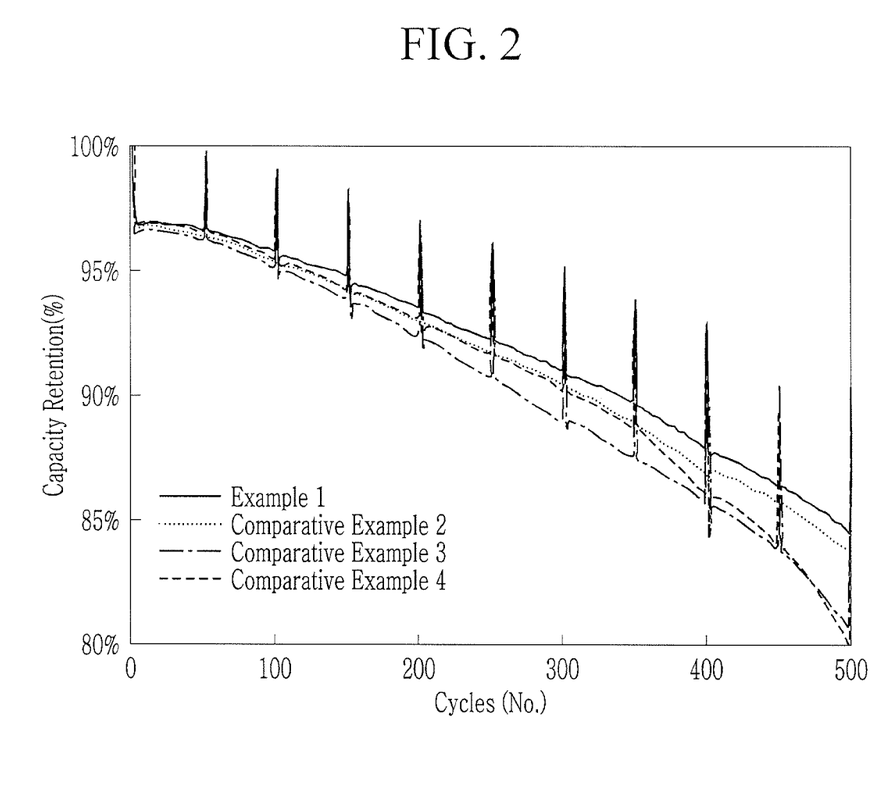
FIG. 2 is a graph showing capacity retentions of rechargeable lithium battery cells respectively including negative electrodes according to Example 1 and Comparative Examples 2 to 4.

As shown in FIG. 2, the battery cell of Example 1 using a carbon nanotube having an average length of 200 μm and carbon black in a weight ratio of 5:1 according to Example 1 showed excellent capacity retention results compared with the battery cell of Comparative Examples 2 to 4 using carbon black and carbon nanotube. The battery cell of Comparative Example 4 using carbon black in an excessive amount of 1 wt % showed very low capacity retention compared with the battery cell of Example 1.

In addition, the rechargeable lithium battery cells according to Examples 1 and 2 and Reference Examples 1 to 2 were charged under a constant current/constant voltage with a cut-off condition of 3.0 C, 4.4 V, and 0.05 C at room temperature (25° C.), paused for 10 minutes, discharged under a constant current with a cut-off condition of 1.0 C, 3.0 V, and 3.0 V, and paused for 10 minutes as one charge and discharge cycle. The charge and discharge cycle was repeated 500 times. A ratio of discharge capacity at the $500^{th}$ cycle relative to discharge capacity at the $1^{st}$ cycle was calculated, and the results are shown in FIG. 3.

Figure 3:
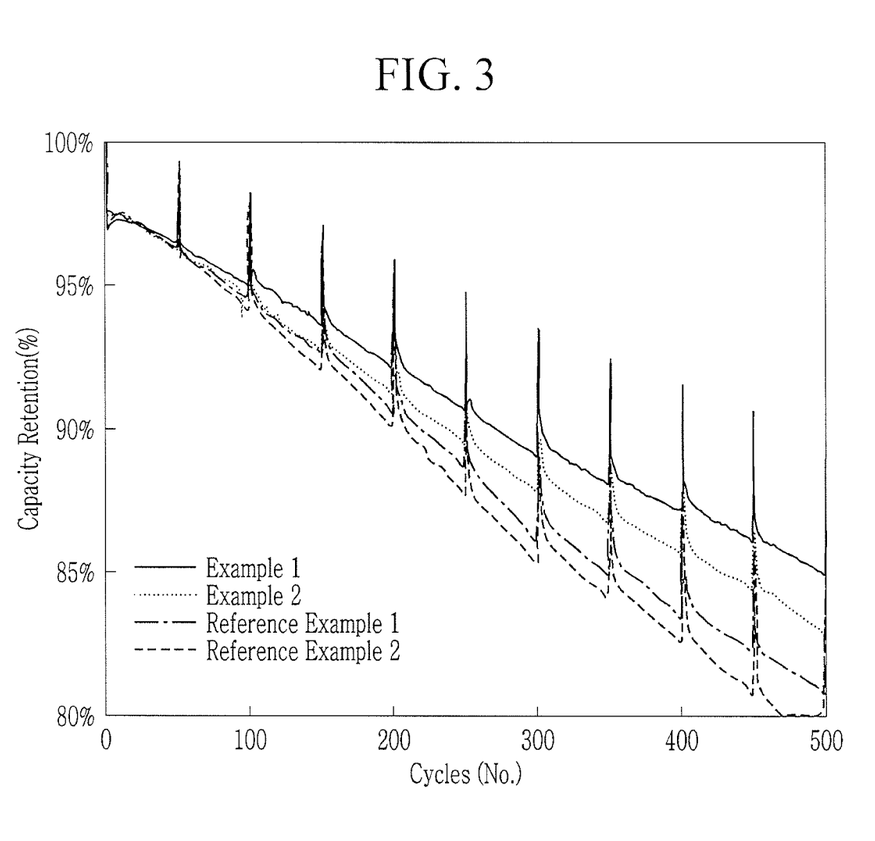
FIG. 3 is a graph showing capacity retentions of rechargeable lithium battery cells respectively including negative electrodes according to Examples 1 and 2 and Reference Examples 1 to 2.

As shown in FIG. 3, the battery cell of Example 1 using a carbon nanotube having an average length of 200 μm and carbon black in a weight ratio of 1:5 and the battery cell of Example 2 using the carbon nanotube and carbon black in a weight ratio of 1:3 showed excellent capacity retention results compared with the battery cell of Reference Example 1 using the carbon nanotube and carbon black in a weight ratio of 1:11.5 and Reference Example 2 using them in a weight ratio of 1:0.5.

The rechargeable lithium battery cells according to Example 1 and Comparative Examples 5 and 6 were charged under a constant current/constant voltage with a cut-off condition of 3.0 C, 4.4 V, and 0.05 C at room temperature (25° C.), paused for 10 minutes, discharged under a constant current with a cut-off condition of 1.0 C, 3.0 V, and 3.0 V, and paused for 10 minutes as one cycle. The cycle was repeated 600 times. A ratio of discharge capacity at the $600^{th}$ cycle relative to discharge capacity of the $1^{st}$ cycle was calculated, and the results are shown in FIG. 4.

Figure 4:
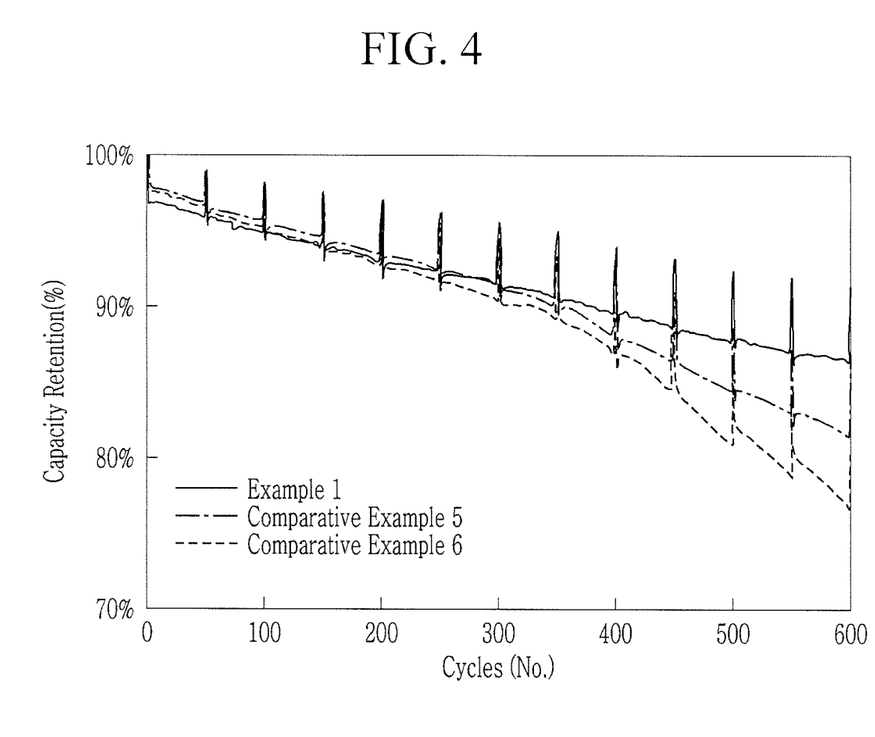
FIG. 4 is a graph showing capacity retentions of rechargeable lithium battery cells respectively including negative electrodes according to Example 1 and Comparative Examples 5 and 6.

As shown in FIG. 4, the battery cell of Example 1 using a carbon nanotube having an average length of 200 μm and carbon black in a weight ratio of 1:5 showed excellent capacity retention compared with the battery cell of Comparative Examples 5 and 6 using a shorter carbon nanotube having an average length of 15 μm.

Evaluation of Thickness Increase Rate

The rechargeable lithium battery cells according to Example 1 and Comparative Examples 2 to 3 were charged under a constant current/constant voltage under a cut-off condition of 3.0 C, 4.4 V, and 0.05 C at room temperature (25° C.) and stored at 60° C. for 4 weeks. A battery thickness before stored (0 W) and r battery thicknesses after being stored for 1 week (1 W), 2 weeks (2 W), 3 weeks (3 W), and 4 weeks (4 W) were respectively measured. The results were used to calculate a battery thickness increase rate, and the results are shown in FIG. 5.

Figure 5:
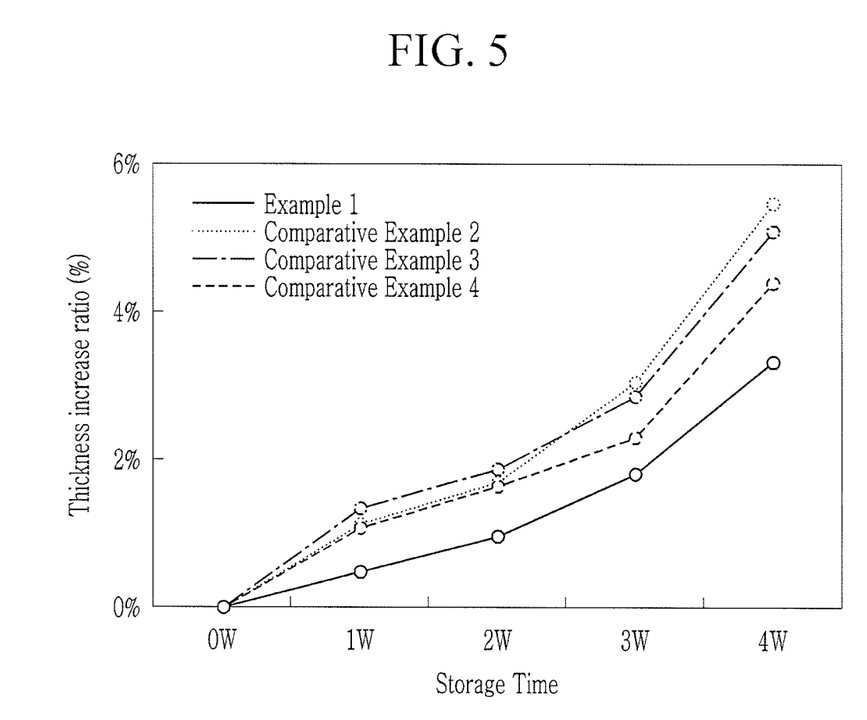
FIG. 5 is a graph showing each thickness variation ratio of the rechargeable lithium battery cells respectively including the negative electrodes according to Example 1 and Comparative Examples 2 to 4 when stored at a high temperature.

As shown in FIG. 5, the battery cell of Example 1 showed a much lower thickness increase rate compared to the battery cells of Comparative Examples 2 to 4 when the rechargeable lithium battery cells according to Example 1 and Comparative Examples 2 to 4 were stored at a high temperature.

Comparative Example 7

A negative electrode was manufactured according to the same method as Example 1, except for a preparing negative active material slurry by mixing 96.7 wt % of an artificial graphite negative active material, 0.2 wt % of the carbon nanotube used in Comparative Example 1, 1.1 wt % of carboxymethyl cellulose, and 2.0 wt % of a styrene-butadiene rubber in a deionized water solvent.

A rechargeable lithium battery cell was manufactured by using the negative electrode and the same positive electrode and electrolyte as those of Example 1.

Comparative Example 8

A negative electrode was manufactured according to the same method as Example 1, except for preparing negative active material slurry by mixing 96.5 wt % of an artificial graphite negative active material, 0.4 wt % of the carbon nanotube used in Comparative Example 1, 1.1 wt % of carboxymethyl cellulose, and 2.0 wt % of a styrene-butadiene rubber in a deionized water solvent.

A rechargeable lithium battery cell was manufactured by using the negative electrode and the same positive electrode and electrolyte as those of Example 1.

Comparative Example 9

A negative electrode was manufactured according to the same method as Example 1 except for preparing a negative active material slurry by mixing 96.3 wt % of an artificial graphite negative active material, 0.6 wt % of the carbon nanotube used in Comparative Example 1, 1.1 wt % of carboxymethyl cellulose, and 2.0 wt % of a styrene-butadiene rubber in a deionized water solvent.

A rechargeable lithium battery cell was manufactured by using the negative electrode and the same positive electrode and electrolyte as those of Example 1.

Figure 6:
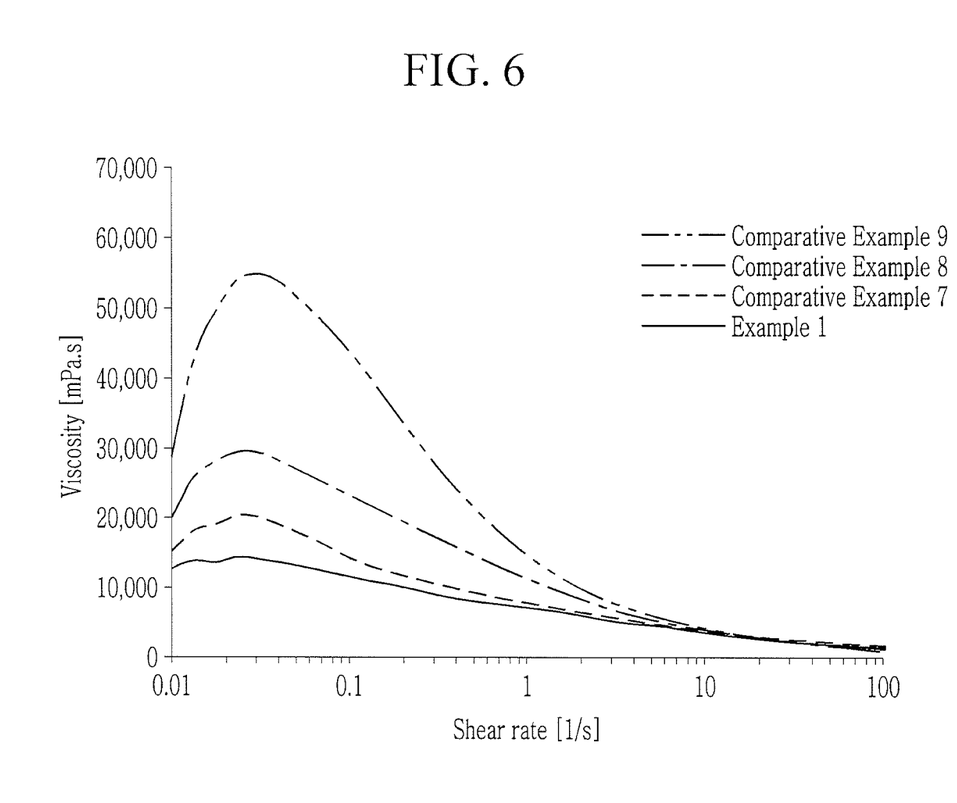
FIG. 6 is a graph showing each room temperature viscosity of negative active material slurries according to Example 1 and Comparative Examples 7 to 9.

The viscosity of each of the negative active material slurries according to Example 1 and Comparative Examples 7 to 9 was measured at room temperature (25° C.) in a shear rate range of 0.01 s$^{-1}$ to 100 s$^{-1}$, and the results are shown in FIG. 6. In FIG. 6, the shear speed is shown as a log value.

As shown in FIG. 6, the negative active slurry of Example 1 using the carbon nanotube and the carbon black together as a conductive material showed remarkably low viscosity compared with the negative active slurries of Comparative Example 7 to 9 including only the carbon nanotube as a conductive material. The negative electrode having low viscosity showed an excellent dispersion state and thus was more homogeneous.

By way of summation and review, an effort to much develop a conventional rechargeable lithium battery technology and thus expand its application to a power storage and the like as well as an electric vehicle has been actively made.

As for negative active materials, various carbon-based negative active materials such as artificial graphite, natural graphite, or hard carbon, which are capable of intercalating or deintercalating lithium ions, or non-carbon-based negative active materials such as silicon or tin which is capable of intercalating or deintercalating lithium ions have been used Embodiments provide a negative electrode for a rechargeable lithium battery capable of decreasing a resistance of a battery and thus improving cycle-life characteristics and swelling characteristics.

Embodiments provide a rechargeable lithium battery including the negative electrode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof the present invention as set forth in the following claims.

What is claimed is:

1. A negative electrode for a rechargeable lithium battery, comprising
   a current collector; and
   a negative active material layer disposed on the current collector, the negative active material layer including a conductive material including a linear-shaped carbon-based material having an average length of about 40 μm to about 250 μm and a dot-shaped carbon-based material, and a negative active material,
   wherein a mixing ratio of the conductive material and the negative active material is a weight ratio of about 0.1:99.9 to about 2.0:98.0.

2. The negative electrode as claimed in claim 1, wherein the mixing ratio of the conductive material and the negative active material is a weight ratio of about 0.3:99.7 to about 1.0:99.0.

3. The negative electrode as claimed in claim 1, wherein the weight ratio of the linear-shaped carbon-based material to the dot-shaped carbon-based material is about 1:1 to about 1:10.

4. The negative electrode as claimed in claim 1, wherein an amount of the conductive material is about 0.1 wt % to about 2.0 wt % based on 100 wt % of the negative active material layer.

5. The negative electrode as claimed in claim 1, wherein an amount of the linear-shaped carbon-based material is about 0.01 wt % to about 0.4 wt % based on 100 wt % of the negative active material layer.

6. The negative electrode as claimed in claim 1, wherein the average length of the linear-shaped carbon-based material is about 70 μm to about 250 μm.

7. The negative electrode as claimed in claim 1, wherein an average diameter of the linear-shaped carbon-based material is about 1 nm to about 20 nm.

8. The negative electrode as claimed in claim 1, wherein a volume density (bulk density) of the linear-shaped carbon-based material is less than or equal to about 0.1 g/cm$^3$.

9. The negative electrode as claimed in claim 1, wherein the linear-shaped carbon-based material includes a carbon nanotube, a carbon nano fiber, or a combination thereof.

10. The negative electrode as claimed in claim 1, wherein a Raman R value of the linear-shaped carbon-based material is about 0.8 to about 1.3, wherein the Raman R value indicates an intensity ratio (R=Id/Ig, of a peak intensity (Id) of a D peak (about 1350 cm$^{-1}$ to about 1360 cm$^{-1}$) relative to a peak intensity (Ig) of a G peak (about 1580 cm$^{-1}$ to about 1590 cm$^{-1}$)) in a Raman spectrum analysis.

11. The negative electrode as claimed in claim 10, wherein the Raman R value is about 0.9 to about 1.1.

12. The negative electrode as claimed in claim 1, wherein the dot-shaped carbon-based material is carbon black.

13. The negative electrode as claimed in claim 1, wherein an average particle diameter (D50) of the dot-shaped carbon-based material is about 5 nm to about 100 nm.

14. The negative electrode as claimed in claim 1, wherein a specific surface area (SSA) of the dot-shaped carbon-based material is about 60 m$^2$/g to about 1000 m$^2$/g.

15. The negative electrode as claimed in claim 1, wherein the negative active material is a material that reversibly intercalates/deintercalates lithium ions, a lithium metal, a lithium metal alloy, a material being capable of doping/dedoping lithium, or a transition metal oxide.

16. The negative electrode as claimed in claim 1, wherein the negative active material is a carbon material that reversibly intercalates/deintercalates lithium ions.

17. A rechargeable lithium battery, comprising
the negative electrode according to as claimed in claim 1;
a positive electrode; and
a non-aqueous electrolyte.

18. The negative electrode as claimed in claim 1, wherein the weight ratio of the linear-shaped carbon-based material to the dot-shaped carbon-based material is 1:3 to 1:10.

19. The negative electrode as claimed in claim 1, wherein:
the linear-shaped carbon-based material includes a carbon nanotube, a carbon nano fiber, or a combination thereof, and
the dot-shaped carbon-based material is carbon black.

* * * * *